United States Patent

[11] 3,612,914

[72] Inventor William Joshua Evans
Berkeley Heights, N.J.

[21] Appl. No. 66,823
[22] Filed Aug. 25, 1970
[45] Patented Oct. 12, 1971

[73] Assignee Bell Telephone Laboratories, Incorporated
Murray Hill, Berkeley Heights, N.J.

[54] AVALANCHE DIODE CIRCUITS
6 Claims, 9 Drawing Figs.

[52] U.S. Cl. ........ 307/285, 307/266, 307/268, 331/107 R, 307/318
[51] Int. Cl. ........ H03k 335
[50] Field of Search ........ 307/266, 268, 318, 285; 331/107 R

[56] References Cited

UNITED STATES PATENTS

| | | | |
|---|---|---|---|
| 3,270,293 | 8/1966 | De Loach et al. | 331/107 R |
| 3,421,025 | 1/1969 | Mitchell et al. | 307/318 X |
| 3,533,017 | 10/1970 | Scherer | 331/107 |
| 3,524,149 | 8/1970 | Socci | 307/285 |

OTHER REFERENCES

Proceedings of the IEEE April 1967 pp. 586- 587 " High Efficiency Silicon Avalanche Diodes at Ultra High Frequencies" by Prager (copy in Scientific Library)

*Primary Examiner*—John S. Heyman
*Attorneys*—R. J. Guenther and Arthur J. Torsiglieri

ABSTRACT: An avalanche diode of the type capable of generating Trapatt mode oscillations is used for generating extremely sharp output voltage spikes. An externally applied input pulse has a current density of $J_T > qv_sN$, where $v_s$ is the saturated drift velocity and $N$ is the impurity concentration of majority carriers in the high-resistance layer of the diode. The output spikes can be used for high speed gating, pulse regeneration, or harmonic generation.

INVENTOR
W. J. EVANS
BY
ATTORNEY

AVALANCHE DIODE CIRCUITS

BACKGROUND OF THE INVENTION

This invention relates to avalanche diode circuits, and more particularly, to circuits using diodes of the type which are capable of generating Trapatt mode oscillations.

An important recent advance in the electronic communications art is the development of the Impatt diode, a negative resistance avalanche diode capable of generating microwave oscillations. The device is described, for example, in the paper "The IMPATT Diode—A Solid-State Microwave Generator," *Bell Telephone Laboratories Record*, by K. D. Smith, Vol. 45, May 1967, page 144; the paper "Microwave Si Avalanche Diode with Nearly Abrupt Type Junction," *IEEE Transactions of Electron Devices*, Vol. ED–14, Sept. 1967, page 580; and the patent of B. C. De Loach, Jr. et al. 3,270,293. The Impatt diode is typically a 3-layer device arranged in a $P^+$ $NN^+$ or $N^+$ $PP^+$ conductivity configuration. An applied DC voltage reverse biases the PN junction to avalanche breakdown to create current pulses, each of which travels across the middle transit layer within a prescribed time period. With the transit time properly arranged with respect to the resonant frequency of an external resonator, repeated avalanche breakdowns occur due to device negative resistance, and self-sustaining oscillations are generated.

The paper of Prager "High-Efficiency Silicon Avalanche Diodes at Ultra-High Frequencies," *Proceedings of the IEEE*, Apr. 1967, pages 586–587, describes an Impatt diode used in an oscillator circuit that gives higher efficiency than would be normally predicted from Impatt diode theory. The Prager et al. oscillator circuit has been the subject of considerable study and an analysis of it is described in the paper by Johnston et al., "High Efficiency Oscillations in Ge Avalanche Diodes Below the Transit Time Frequency," *Proceedings of the IEEE*, Vol. 56, Sept. 1968, pages 1611–1613. These papers recognize that such high-efficiency operation requires a circuit having a high Q cavity resonance at the normal Impatt frequency $f_i$, and also a resonance at an output frequency of $f_i/n$, where $n$ is an integral number. This mode of oscillator operation is now known as the Trapatt mode, an acronym for trapped plasma avalanche triggered transit.

The Trapatt mode is also analyzed in the copending application of De Loach-Scharfetter, Ser. No. 854,678, filed Sept. 2, 1969, and assigned to Bell Telephone Laboratories, Incorporated, which explains that the Trapatt mode is characterized not only by an avalanche breakdown at the PN junction, but by an avalanche shock front that traverses the entire diode transit layer. Besides the known external circuitry, the De Loach et al. application explains certain requirements of the diode for proper Trapatt mode operation; for example, the applied voltage must be sufficiently high that at avalanche breakdown the electric field extends though the entire distance of the transit layer.

SUMMARY OF THE INVENTION

Studies of the Trapatt mode of oscillation show that the formation of avalanche shock fronts results from the abrupt application of a current density above a specific threshold value. In the oscillator circuit, operation originates in the conventional Impatt mode, but the low-frequency external resonator reflects energy back to the diode in such a way as to permit buildup of applied diode current density. The formation of the avalanche shock fronts characteristic of high-efficiency Trapatt operation occurs only after a prescribed threshold of applied current density $J_T$ has been reached, where $J_T$ is given by $$J_T > qv_sN \qquad (1)$$

where $q$ is the electronic charge, $v_s$ is the saturated drift velocity and $N$ is the impurity concentration in the high-resistivity transit layer of the diode.

I further concluded that avalanche shock fronts could be individually triggered in an appropriate Trapatt diode by applying an external current pulse, rather than replying on an internal current buildup. Because an avalanche shock front is characterized by an extremely steep voltage change, this discovery permits the realization of several new and useful high-frequency circuits.

A harmonic generator embodiment of the invention makes use of the fact that a rapid change of voltage inherently includes extremely high-frequency components. Thus, input pulses are applied to a Trapatt diode through a low-pass filer to trigger avalanche shock fronts, while the diode output is directed through a high pass filter which removes the high-frequency components of the output voltage.

In a pulse regenerator embodiment, input pulses to be regenerated each trigger avalanche shock fronts in the diode. Each avalanche shock front in turn generates a high amplitude, high-voltage spike which constitutes the regenerated form of the input pulse.

A high-speed gate embodiment uses a high-current pulse to switch a Trapatt diode to a conducting condition by triggering an avalanche shock front. Because of the rapid voltage change caused by the shock front, the diode is switched to a conducting condition much more sharply than in conventional gates. A lower amplitude trailing edge portion of the gate pulse is used to remove plasma from the gate to return it to its nonconducting condition, as will be explained later.

These and other objects, features, and advantages of the invention will be better understood from a consideration of the following detailed description taken in conjunction with the accompanying drawing.

DRAWING DESCRIPTION

DETAILED DESCRIPTION

Figure 1:
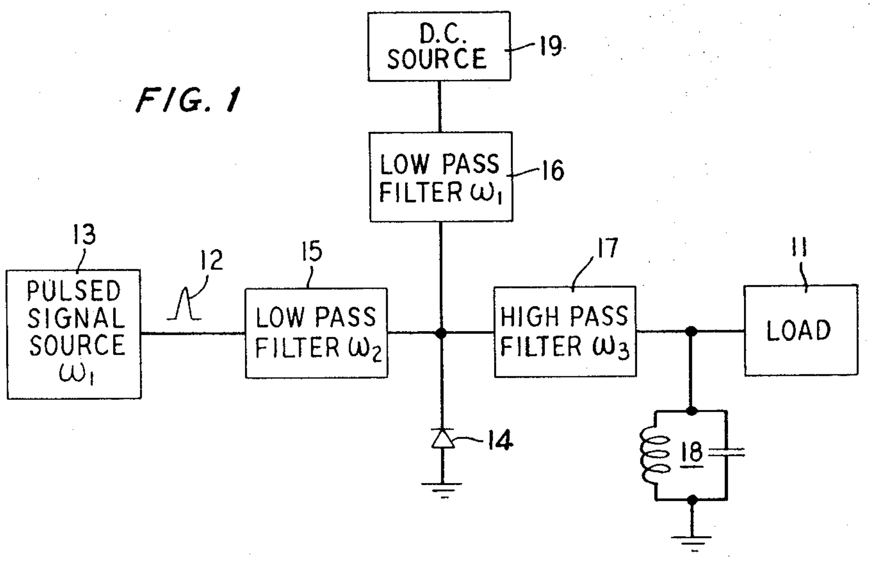
FIG. 1 is a schematic view of a harmonic generator circuit which constitutes one illustrative embodiment of the invention.

Referring now to FIG. 1, there is shown a schematic diagram of a harmonic generator which illustratively embodies the invention. The purpose of the circuit is to generate and transmit to a load 11 harmonic frequency components of input pulses 12 from a signal source 13. The circuit comprises a Trapatt diode 14, low-pass filters 15 and 16, a high-pass filter 17, a harmonic frequency resonant circuit 18, and a DC source 19 for biasing the diode. Filters 15, 16, and 17 respectively have frequency passbands centered on frequencies $\omega_1$, $\omega_2$, and $\omega_3$ where $$\omega_1 < \omega_2 < \omega_3 \qquad (2)$$

The DC source 19 reverse biases diode 14 at a voltage below that required for avalanche breakdown. Each input pulse 12 biases the diode at a sufficient voltage not only to cause avalanche breakdown, but also to trigger an avalanche shock front in the diode. As will be explained later, this creates in the diode a voltage waveform having an extremely high slope that is inherently rich in higher harmonics of the input wave. The higher harmonic components generated by the diode are directed though high-pass filter 17 to resonator 18 where they are converted to a useable sinusoidal form and transmitted to the load 11. The resonant frequency of circuit 18 is a higher harmonic of the input frequency $\omega_i$ and is within the passband of filter 17.

Figure 2:
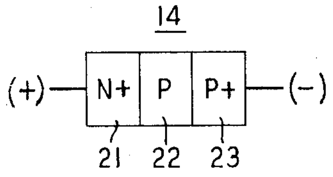
FIG. 2 is a schematic view of the diode of FIG. 1.

In accordance with the invention, diode 14 is typically a Trapatt diode; that is, a diode capable of sustaining Trapatt mode oscillations. As such, it may be of the form shown in FIG. 2 comprising layers 21, 22 and 23 of $N^+$, P, and $P^+$ conductivity respectively. The aforementioned De Loach et al. application points out that the transit layer 22 must be sufficiently small that at the reverse breakdown voltage, the internal electric field extends the entire distance from layer 21 to layer 23. The diode may be of silicon with layers 21, 22, and 23 having resistivities of 0.001, 2.0, and 0.001 ohm/cm., respectively. The width *w* of the transit layer 22 may be 1.0 micrometer. I have found that any diode capable of supporting Trapatt mode oscillations is capable of generating avalanche shock fronts in response to an appropriate applied external voltage such as pulse 12. However, diodes that may require an unusually high energy in the applied pulse for avalanche shock front formation may not be practical in a Trapatt oscillator circuit, and yet be useful in circuits embodying the present invention; the reasons for this are rigorously set forth in the appendix.

Figure 3:
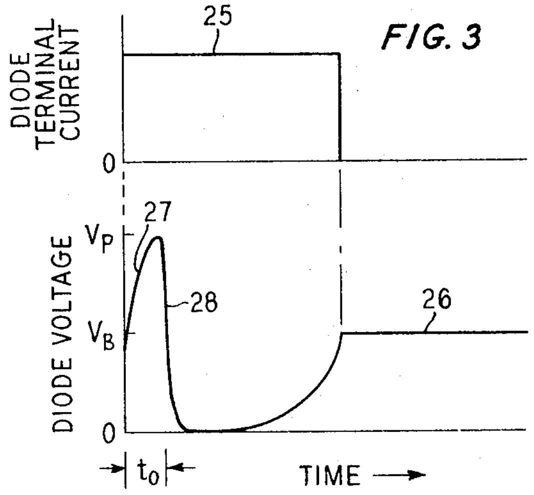
FIG. 3 is a graph illustrating terminal current and terminal voltage of the diode of FIGS. 1 and 2.

Referring to FIG. 3, curve 25 illustrates the diode terminal current resulting from the application of pulse 12 of FIG. 1 with curve 26 representing the corresponding diode terminal voltage. A high-current density $J_T$ is applied by the pulse at time $t=0$ causing the diode voltage to rapidly rise beyond the breakdown voltage $V_B$ as shown by curve portion 27. As is described in more detail in the appendix, an avalanche shock front is formed which results in a very abrupt collapse of the electric field in the diode; the slope of voltage wave portion 28 during the field collapse is much greater than the slope of curve portion 27. The avalanche shock front propagates very rapidly across transit portion 22 of FIG. 2; thus, the voltage collapse occurs in a time which is considerably less than the transit time of carriers moving at saturated velocity. The waveform therefore contains a higher harmonic content than conventional transit time harmonic generators such as the snap diode.

Harmonic generation if only one use of applicant's discovery that an avalanche shock front can be controllably triggered in a Trapatt diode by an externally applied pulse. An analysis of the avalanche shock front will be given in the appendix. The important requirement for the input pulse, however, is that it apply a threshold current density $J_T$ which conforms to the relation $$J_T > q v_s N \qquad (3)$$

where $q$ is the electronic charge, $v_s$ is the saturated drift velocity of majority carriers in the transit region, and $N$ is the net impurity concentration in the transit region. If this current density is applied abruptly to the diode, it will trigger an avalanche shock front with a voltage waveform 26 having the threshold voltage $V_T$ given by $$V_T = V_B + \overline{w} J_T t_0 / \epsilon \qquad (4)$$

where $V_B$ is the reverse breakdown voltage, $\overline{W}$ is the width of the transit region, $t_0$ is charging time of the voltage waveform illustrated in FIG. 3 and defined mathematically in the appendix, and $\epsilon$ is the dielectric constant of the transit layer.

Referring to FIG. 3, there is shown schematically a pulse regenerator embodiment comprising a Trapatt diode 31 for regenerating input pulses 32 from a signal source 33. As before, the diode is reverse biased at a voltage slightly below the avalanche breakdown voltage. Each input pulse 32 is of sufficient amplitude to comply with equation (3) and to trigger an avalanche shock front. The output voltage waveform of FIG. 3 is modified by the RC time constant of load 34 and capacitor 35 to give a sharp output pulse 36 across the load. It can be appreciated that, because of the voltage collapse represented by portion 28 of FIG. 3, a negatively extending output pulse is generated which is of a higher amplitude and faster rise time than the input pulse. The RC time constant determines the output pulse width and is normally shorter than the duration of the input pulse.

Figure 4:
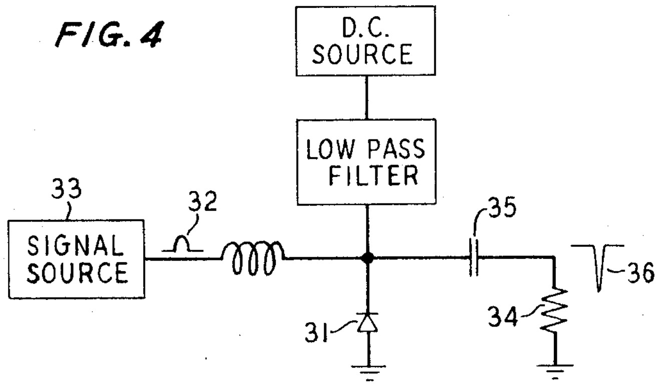
FIG. 4 is a schematic view of a pulse regenerator circuit which constitutes a second illustrative embodiment of the invention.

The circuit of FIG. 4 may typically be used in a pulse code transmission system in which information is defined by the presence or absence of pulses. Dependable amplification of the signal then merely requires that a high-amplitude output pulse be generated in response to input pulse, rather than giving faithful amplification of the input waveform.

Figure 5:
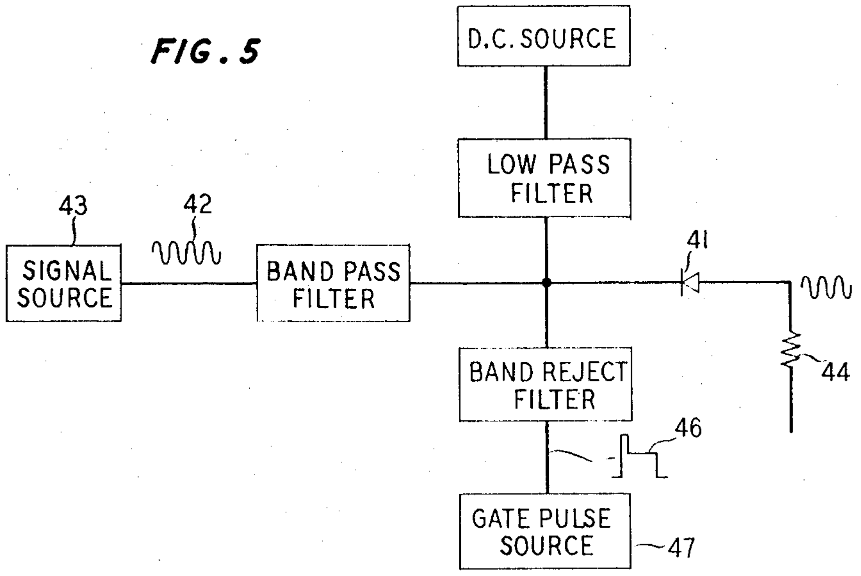
FIG. 5 is a schematic illustration of a gate circuit which constitutes another embodiment of the invention.

Referring now to FIG. 5, there is shown a high-speed gate circuit comprising a Trapatt diode 41 for controllably conducting portions of a high-frequency signal 42 from a source 43. In the nonconducting condition, the diode is biased slightly below avalanche breakdown and none of the signal reaches load 44. The diode is switched to a conducting condition by a gate signal 46 originating at a source 47.

The leading portion of the gate signal pulse 46 is of sufficient amplitude to trigger an avalanche shock front in the diode 47. Referring again to curve 26 of FIG. 3, conduction in the diode occurs after the voltage collapse depicted by curve portion 28. Because of the steep slope of curve portion 28, conduction occurs extremely abruptly, and "turn-on" transients are virtually eliminated. Thus, the gate circuit is particularly useful if the gated signal 42 is of high frequency and if the leading edge transients are to be an insubstantial portion of a wavelength.

It can be shown that passage of an avalanche shock front leaves in the diode a plasma which tends to maintain the diode in a conducting condition even after the gate pulse has terminated. This diode plasma, or charge Q, is given by the term $$Q \approx 1.2\, J_T A w / v_s\, [ln(2.2 J_T / J_{cs})] \qquad (5)$$

where $A$ is diode area, and $J_{cs}$ is the reverse saturated current density. The charge Q will, of course, recombine within the diode within a finite time to return the diode to its nonconducting condition. Alternatively, the charge Q may be removed by directing a current I through the diode for the time T during which it is desired that the diode be conducting, where I complies with the term $$I < Q/T \qquad (6)$$

The trailing edge portion of the gate pulse 46 complies with relationship (6), its purpose being to give a sharp cutoff of diode conduction after a specific predetermined time T.

The particular circuits described herein are intended merely to be illustrative of the inventive concept and numerous other embodiments and modifications may be made by those skilled in the art without departing from the spirit and scope of the invention.

APPENDIX

The time delay in the avalanche process which allows the diode to sustain a voltage above breakdown can be calculated analytically with good accuracy. The following assumptions are made before writing down the continuity equations:

1. equal electron and hole drift velocities, $v$,
2. equal electron and hole ionization rates, $\alpha$, and
3. diffusion is neglected.

Then:

$$(1/v)\,(\delta j_p/\delta t) = -(\delta j_p/\delta x) + \alpha(j_p + j_n) \qquad (7)$$

$$(1/v)\,(\delta j_n/\delta t) = (\delta j_n/\delta x) + \alpha(j_p + j_n) \qquad (8)$$

where $j_n$ and $j_p$ are the electron and hole drift currents and $\alpha$ is the ionization coefficient.

Equations (7) and (8) are integrated over the width $w$ of the avalanche region and added to give, $$(w/2v)(dJ_c/dt) = \int_0^{w} \alpha(E)(j_p + j_n)dx - J_c \qquad (9)$$

where $$J_c \triangleq (1/w) \int_0^{w} (j_p + j_n)dx \qquad (10)$$

and where the reverse saturation current is neglected. $J_c$ is the conduction current component of the diode terminal current.

Since we are interested in only a small part of the complete Trapatt cycle, several other assumptions can be made. FIG. 3 shows the carrier densities and field profile for a germanium diode at the time when diode voltage reaches a maximum. This result was obtained by computer, and does not make the simplifying assumptions introduced in this appendix. Note that the field does not change greatly over regions where the electron and hole densities are large. Therefore, equation (9) can be written as, $$(w/2)(dJ_c/dt) = J_c(w)\alpha(\overline{E}_o) - 1) \qquad (11)$$

where $\overline{E}$ is the average value of the field over the avalanche zone. (At this point in time the carriers have drifted only a small distance.)

If initially the diode is assumed to be biased to breakdown and to be carrying a DC current $J_{co}$, then a large step in terminal current will typically drive the peak field in the diode to a value about 50 to 100 percent higher than that required to sustain the DC current. Over this range of fields the ionization coefficients are safely approximated by the form, $$\alpha = A_0 e^{\lambda E} \qquad (12)$$

where $A_o$ and $\lambda$ are experimentally determined constants and $E$ is the electric field, provided that $A_o$ and $\lambda$ are determined by matching this equation to the experimental values at the two extremes.

Figure 7:
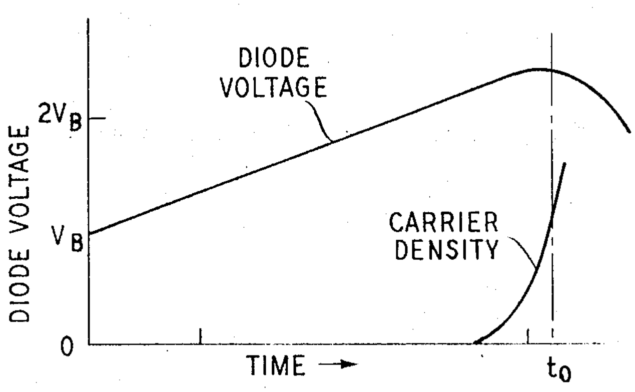

A good approximation for the time dependence of the field in the diode becomes apparent if we examine another result from the computer simulation. FIG. 7 shows the voltage response from FIG. 3 on an expanded scale. Notice that the response is linear until just before the voltage begins to fall and that the terminal current is principally displacement current up to that time. Therefore, the terminal current $J_T$ is, $$J_T \cong (\epsilon/\overline{w})(dV/dt) \qquad (13)$$

or $$V = V_B + (\overline{w} J_T t/\epsilon) \qquad (14)$$

where $V_B$ is the breakdown voltage and $\overline{w}$ is the depletion width. Thus, the field in the avalanche region is, $$\overline{E}(t) - E_c + (J_T t/\epsilon) \qquad (15)$$

Equations (11) and (12) give, $$\frac{w}{2v} \ln J_c/J_{co} = \int_0^t (w A_o e^{\lambda(E_o + J_T t/\epsilon)} - 1)\,dt. \qquad (16)$$

But the integral of the ionization rate over the avalanche zone $w$ gives, $$\int_0^w A_o e^{\lambda E o} dx = 1. \qquad (17)$$

Therefore, $$\frac{w}{2v} \ln J_c/J_{co} = \frac{\epsilon}{J_T \lambda}\left(\epsilon^{\lambda J_T t/\epsilon} - 1\right) - t. \qquad (18)$$

When the conduction current equals the terminal current, the diode voltage has reached the maximum; i.e., the time required for $J_c = J_T$ is approximately, $$t_o = (1/\theta) ln[1 + \theta(t_o + \tau\gamma ln\theta/\theta_o)] \qquad (19)$$

where $\theta \equiv \lambda J_T/\epsilon$ $\theta_o \equiv \lambda J_{co}/\epsilon$ $\tau \equiv w/2v$ $\gamma \equiv w/\overline{w}$.

Note that this equation is transcendental in $t_o$ but for most cases it converges rapidly by successive approximation.

The ionization rates for holes and electrons are given approximately by, $$\alpha_{n,p} = A_{n,p} e^{-b_{n,p}/E}. \qquad (20)$$

Equation (20) has been used in the computer simulation mentioned previously. For a 50 GHz. abrupt-junction silicon Impatt diode, with a depletion width of 0.6 $\mu$m., the peak field in the diode at breakdown is approximately $5\times10^5$ v./cm. The peak field required to initiate an avalanche shock front may be as high as twice this value; therefore the constants of equation (12) have been obtained by matching it to $(\alpha_n + \alpha_p)/2$ at $5\times10^5$ and $10^6$ v./cm. for silicon at 160° C. Note that, for silicon, the ionization rate $\alpha_p << \alpha_n$, whereas the rates were assumed equal in deriving equation (19). However, if we assume $\alpha_p = 0$, rederivation of equation (11) results in a factor of ½ in the first term on the right side of the equation. However, if $\alpha_p = 0$, the average value of the ionization rates is $\alpha_n/2$. Thus, we obtain the same result for the time delay in either case.

Figure 8:
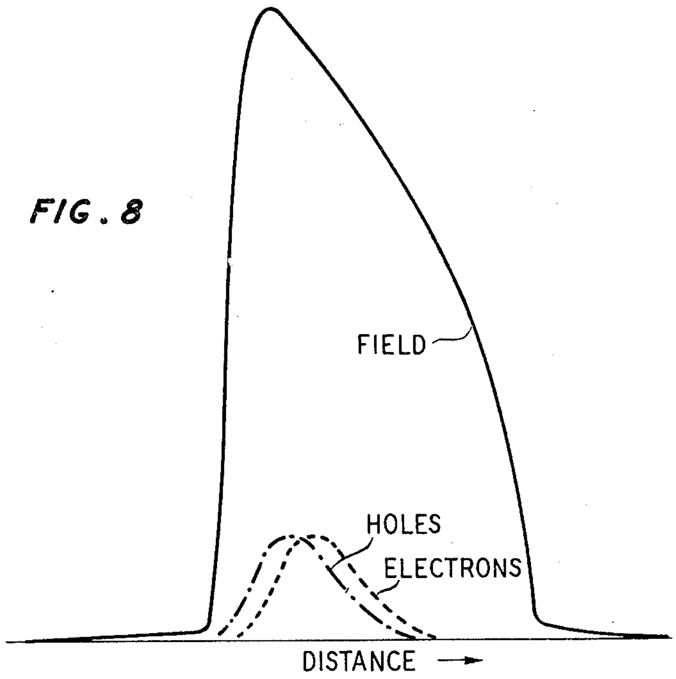
Figure 9:
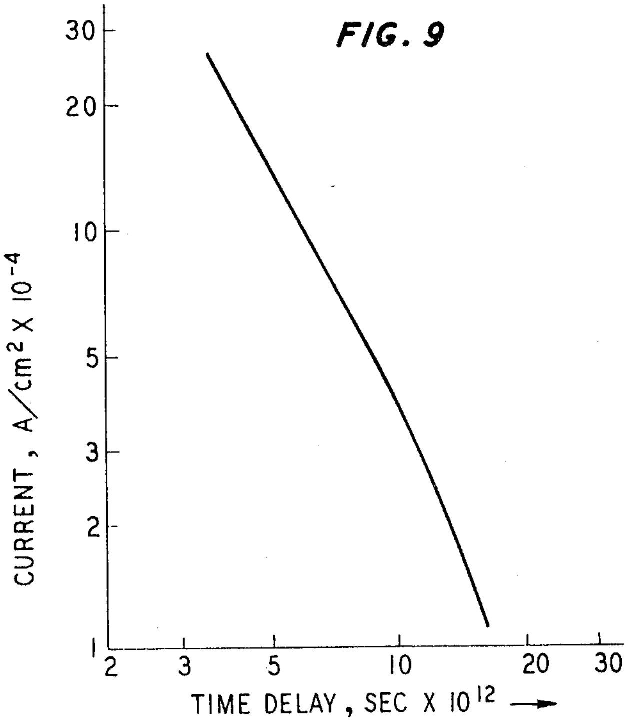

The field and carrier densities at the instant of maximum voltage for the 50 GHz. diode are shown in FIG. 8. In this case the avalanche region is seen to be relatively somewhat wider than that shown in FIG. 6. Using a value of $\gamma = 0.3$ in equation (19), the time delay vs. the terminal current density has been calculated for this diode and is shown in FIG. 9. The points shown were obtained by the computer simulation referred to previously. Over the range of interest (i.e., 20,000 to 125,000 a./cm.², where high-efficiency Trapatt operation would occur) the slope of this curve is approximately one-half.

Figure 6:
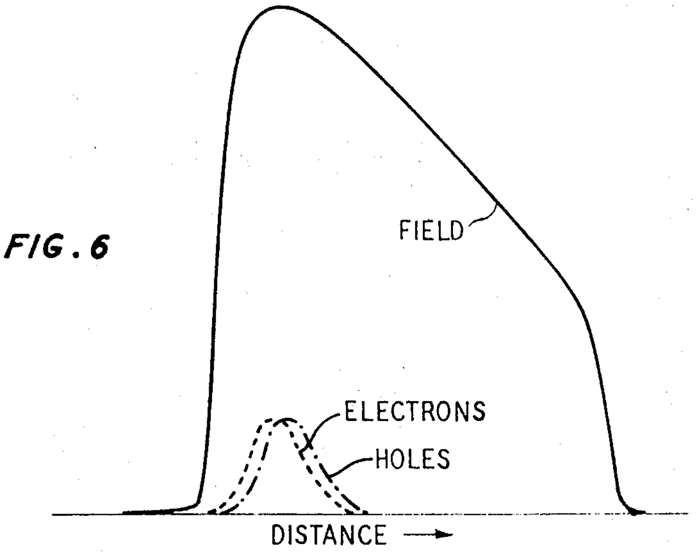
FIGS. 6 through 9 are graphs illustrating diode operation in the embodiments of FIGS. 1, 4 and 5.

In comparing FIGS. 6 and 8 it is clear that the effective avalanche width is a much smaller fraction of the total diode width for the lower frequency diode. Thus, for the 50 GHz. diode the relative delay time is increased and the overvoltage exceeds twice $V_B$ for the current densities of interest. However, if $\gamma$ (the fractional avalanche width) is held constant at a value appropriate for a low-frequency silicon diode (~0.3) the delay time is reduced and the overvoltage is comparable to the low-freuqency diode. These effects occur because of the decreasing slope of the ionization rates with increasing field. The decreasing slope requires that the excess field (above $E_o$) be greater in order to create the same over multiplication in the diode. This leads to a broader avalanche region and a larger overvoltage.

The simple calculation given here does not account for all of the overvoltage predicted by the computer simulation. The difference in the two results is due to a broadening of the depletion width with increasing voltage which occurs in the simulated diode. This effect is caused by out-diffusion in the simulated structure which is more important in high-frequency diodes. In the example considered here, the depletion layer width increases by approximately 20 percent when the diode voltage is raised from the breakdown voltage $V_B$ to 3 $V_B$. Thus, in some cases, out-diffusion is detrimental to Trapatt oscillator performance, although it may still be practical for switching in accordance with the invention.

What is claimed is:

1. An electronic wave translating circuit comprising a diode having first, second, and third crystalline semiconductor layers, the first and second layers forming a PN junction and the third layer being of relatively high conductivity, the second layer being of sufficiently small width that, when a sufficient reverse-bias voltage is applied to the junction to cause avalanche breakdown, an electric field extends the entire distance from the PN junction to the third layer;

means for reverse-biasing the diode at a voltage below the avalanche breakdown voltage;

and means comprising an external signal source for applying a current density $J_T$ substantially conforming to the relationship $$J_T > q v_s N$$

where $q$ is the charge on a majority carrier in the second layer, $v_s$ is the saturated drift velocity of carriers in the second layer and $N$ is the net impurity concentration of the second layer, whereby the diode is capable of forming and propagating avalanche shock fronts.

2. The translating circuit of claim 1 wherein:

the external signal source comprises a source of AC energy of a first frequency; and further comprising:

a high-frequency output passband filter connected to the diode for passing only frequencies much higher than the first frequency;

and a resonator connected to the passband filter having a resonant frequency much higher than that of the first frequency, whereby the electronic wave translating circuit constitutes a harmonic generator.

3. The translating circuit of claim 2 wherein:

said diode is of a type which, when included in an appropriate circuit, is capable of supporting Trapatt mode oscillations.

4. The pulse current of claim 1 wherein:

the signal source comprises a source of pulses to be regenerated;

and output voltage spikes from the diode are transmitted to a load, whereby the translating circuit constitutes a pulse regenerator.

5. The electronic wave translating circuit of claim 1 further comprises:

a transmission line for transmitting high-frequency current to be gated, said transmission line being connected to the diode;

and wherein the signal source comprises a source of gate signals, for causing said diode to switch rapidly to a conducting condition, and thereby to transmit said high-frequency current from said transmission line.

6. The wave translating circuit of claim 5 wherein:

the gate signal source comprises means for generating gating pulses each having a high-amplitude leading edge which is sufficient to trigger said avalanche shock front, and a lower amplitude trailing portion.